United States Patent [19]

Gatewood

[11] Patent Number: 4,485,908
[45] Date of Patent: Dec. 4, 1984

[54] VIBRATION DAMPER WITH VARIABLE RATE SPRINGS AND DAMPING FRICTION

[75] Inventor: Sidney U. Gatewood, Roseville, Mich.

[73] Assignee: Borg-Warner Corporation, Chicago, Ill.

[21] Appl. No.: 386,567

[22] Filed: Jun. 9, 1982

[51] Int. Cl.³ .......................... F16D 3/14; F16D 3/66
[52] U.S. Cl. ............................ 192/106.2; 192/70.17; 464/64; 464/68
[58] Field of Search ............... 192/70.17, 106.1, 106.2; 464/64, 66, 68, 81, 160

[56] References Cited

U.S. PATENT DOCUMENTS

| | | | |
|---|---|---|---|
| 1,952,892 | 3/1934 | Reed | 192/106.2 |
| 1,966,948 | 7/1934 | Forsythe | 192/106.1 |
| 2,097,627 | 11/1937 | Lewis | 192/106.2 |
| 2,118,913 | 5/1938 | Bachman | 192/70.17 |
| 2,745,268 | 5/1956 | Reed | |
| 3,408,830 | 11/1968 | Sutaruk et al. | 464/180 |
| 3,948,373 | 4/1976 | Wörner | 192/106.2 |
| 3,982,617 | 9/1976 | Wörner | 192/106.2 |
| 4,044,874 | 8/1977 | Wörner | 192/106.2 |
| 4,177,888 | 12/1979 | Arrowsmith | 192/106.2 |

FOREIGN PATENT DOCUMENTS 2078906  1/1982  United Kingdom ............... 464/180

Primary Examiner—Rodney H. Bonck
Assistant Examiner—James J. Merek
Attorney, Agent, or Firm—James A. Geppert

[57] ABSTRACT

A vibration damper assembly for the clutch driven plate utilized in an automotive vehicle which provides a first stage of travel with a low spring rate and zero or low damping friction and a second stage of travel with an increased spring rate and increased damping friction as required for the remaining travel. A generally conventional clutch driven plate assembly has aligned spring windows in the plates and hub flange receiving low rate compression springs and additional aligned spring windows receiving the higher rate compression springs; the windows in the hub flange being enlarged relative to the windows in the plates, a generally annular friction plate received within the central opening of the spring retainer plate with peripheral tangs on the friction plate received in enlarged notches in the retainer plate inner periphery to provide a limited lost motion, and a thrust plate and Belleville spring urging said friction plate against the hub.

12 Claims, 10 Drawing Figures

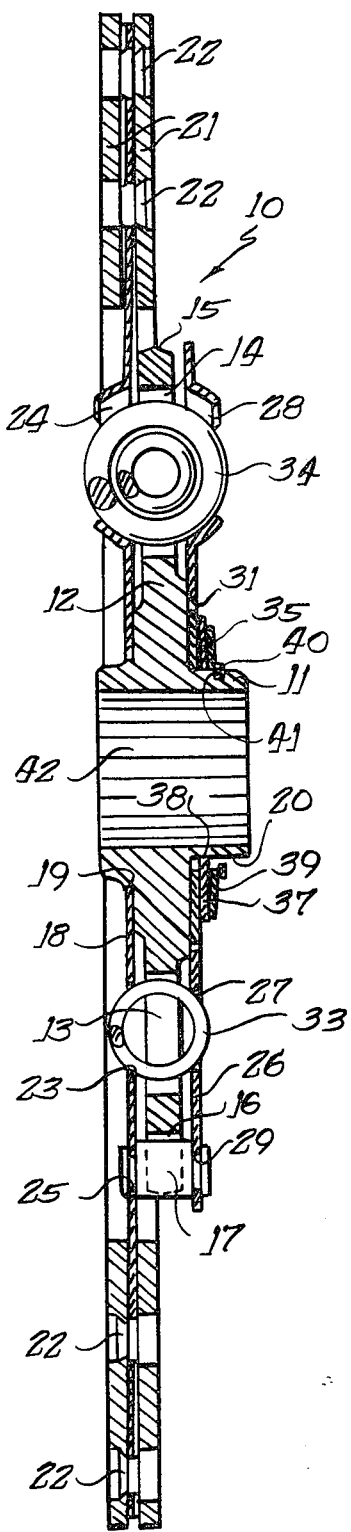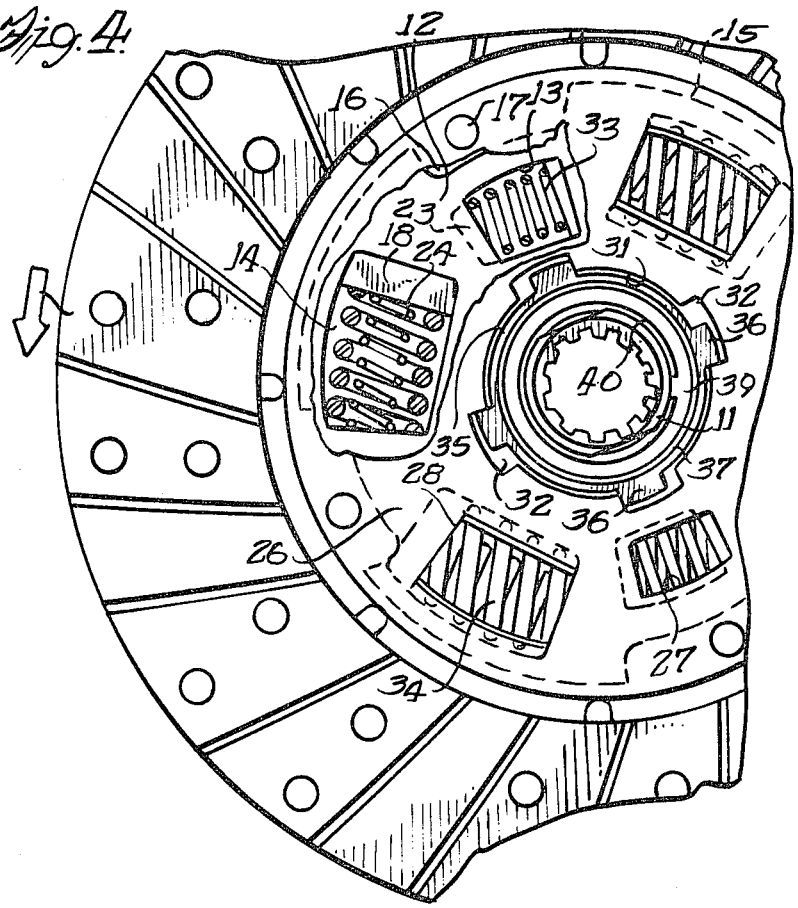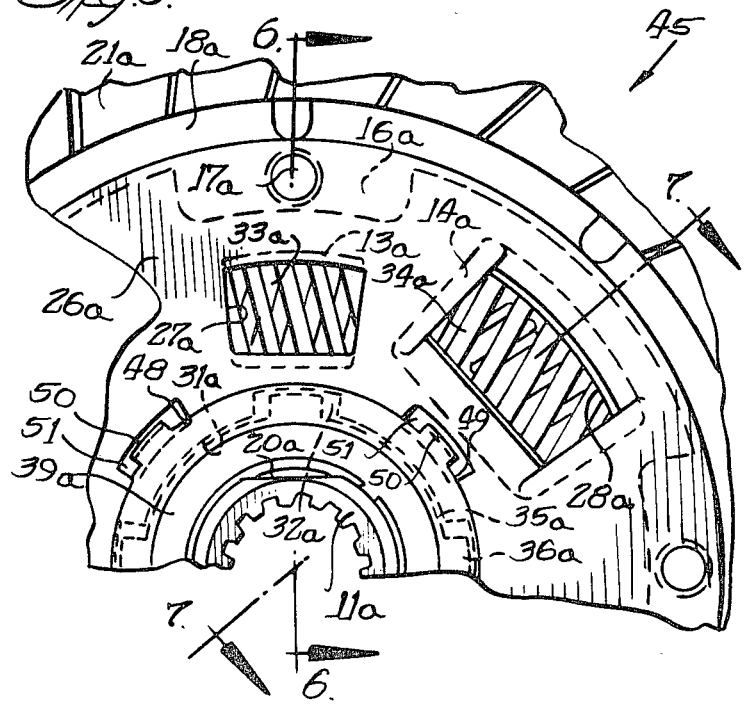

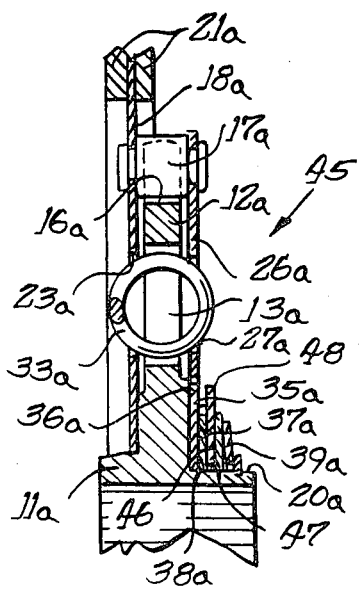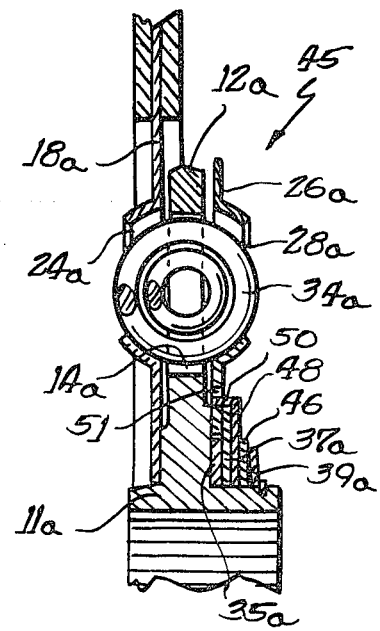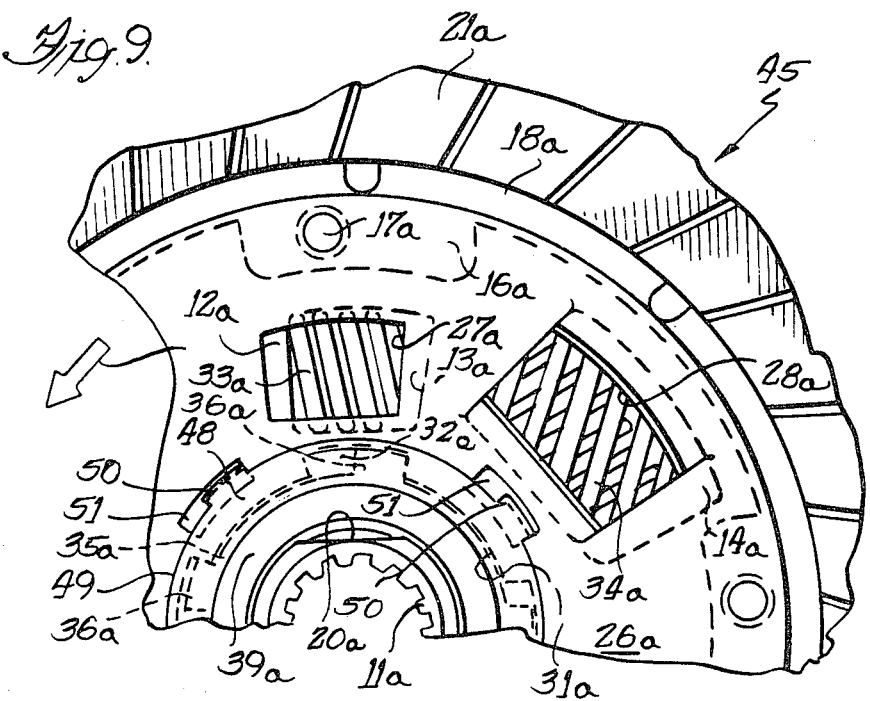

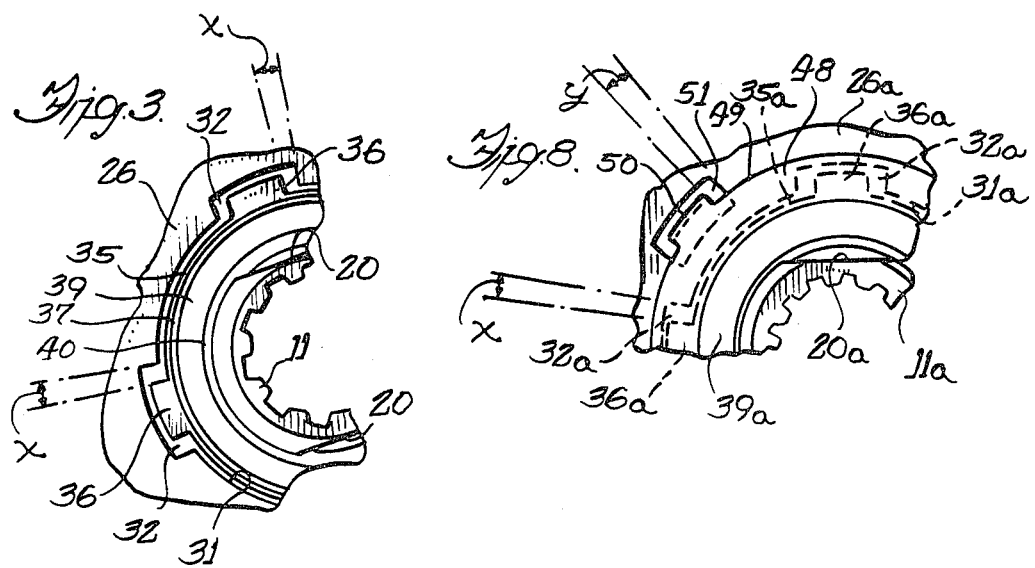
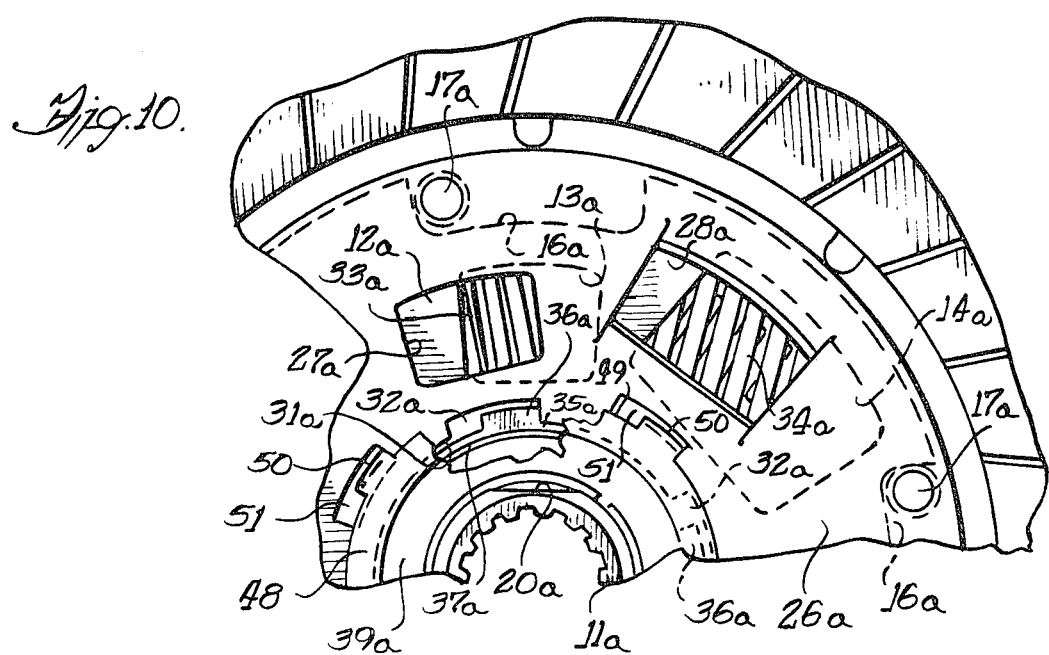

VIBRATION DAMPER WITH VARIABLE RATE SPRINGS AND DAMPING FRICTION

BACKGROUND OF THE INVENTION

Clutch driven plates generally utilize vibration damping means in a manually-actuated vehicle transmission to overcome objectionable vibration and rattle during the torsional coupling of the engine driven shaft and the transmission input shaft by a friction clutch. A conventional vibration damper assembly includes a hub having an internally splined passage to receive the splined end of a transmission input shaft and a radial flange, a clutch plate journalled on the hub and carrying the friction facings at its periphery, a spring retainer plate journalled on the hub on the opposite side of the hub flange from the clutch plate, and damper springs positioned in axially aligned sets of spring windows in the hub flange and the clutch and spring retainer plates. The clutch plate and spring retainer plate are connected together by stop pins extending through elongated peripheral notches in the hub flange.

This damper assembly provides for a substantially constant rate of energy dissipation, and friction washers may be positioned between the hub flange and the clutch and spring retainer plates to provide additional damping friction in predetermined stages. However, the above described vibration damper assembly has proved to be inadequate where specialized problems occur, such as gear rattle at an idle condition, necessitating a multi-stage vibration damping arrangement, with or without friction damping in the stages. The present invention provides such a multi-stage damper to overcome the specialized problems encountered in a vehicle drive line.

SUMMARY OF THE INVENTION

The present invention comprehends the provision of a multi-stage vibration damper in a friction clutch plate to provide a low spring rate first stage with zero or low damping friction for the initial travel and a second stage of travel with an increased spring rate and increased damping friction as required for the remaining travel of the damper assembly. The first stage of travel utilizes a pair of diametrically opposed low rate compression springs with substantially no friction damping, and the second stage of travel utilizes four sets of compression damping springs having a higher spring rate; the second stage being accompanied by movement of a friction plate together with a spring retainer plate of the clutch plate assembly. The friction plate includes peripheral tangs received in notches formed in the inner periphery of the retainer plate, the slots being dimensioned to provide relative lost motion during the first stage of travel of the damper assembly.

The present invention also comprehends the provision of a multi-stage vibration damper assembly which will provide damping friction variations of zero friction, single friction or double friction as desired by addition of a second friction plate and by modification of the clearances between the slot and tang connection of the friction plates in the vibration damper assembly. In this assembly, a first friction plate is positioned within the inner periphery of and in the same plane of the spring retainer plate while the second friction plate is located between parallel thrust plates adjacent the spring retainer plate and has forwardly projecting tangs received in slots formed in the retainer plate at a larger diameter than the diameter of the first friction plate. The second friction plate will be picked up at the same or a later point than the first friction plate upon the rotary movement of the spring retainer plate.

Further objects are to provide a construction of maximum simplicity, efficiency, economy and ease of assembly and operation, and such further objects, advantages, and capabilities as will later more fully appear and are inherently possessed thereby.

DESCRIPTION OF THE DRAWINGS

FIG. 2 is a cross sectional view through the clutch plate assembly taken on the irregular line 2—2 of FIG. 1.

FIG. 3 is an enlarged partial rear elevational view showing the relationship of the friction plate, hub and spring retainer plate.

FIG. 4 is a partial rear elevational view of the clutch plate assembly upon movement through the first stage of travel.

FIG. 5 is a partial rear elevational view of a clutch plate assembly with an alternate embodiment of vibration damper.

FIG. 6 is a partial cross sectional view taken on the line 6—6 of FIG. 5.

FIG. 7 is a partial cross sectional view taken on the line 7—7 of FIG. 5.

FIG. 8 is an enlarged partial rear elevational view showing the relationship of the friction plates, hub and spring retainer plate.

FIG. 9 is a partial rear elevational view of the clutch assembly upon movement through the first and second stages of friction damping travel.

FIG. 10 is a partial rear elevational view similar to FIG. 9 showing further movement of the damper assembly.

DESCRIPTION OF THE PREFERRED EMBODIMENTS

Figure 1:
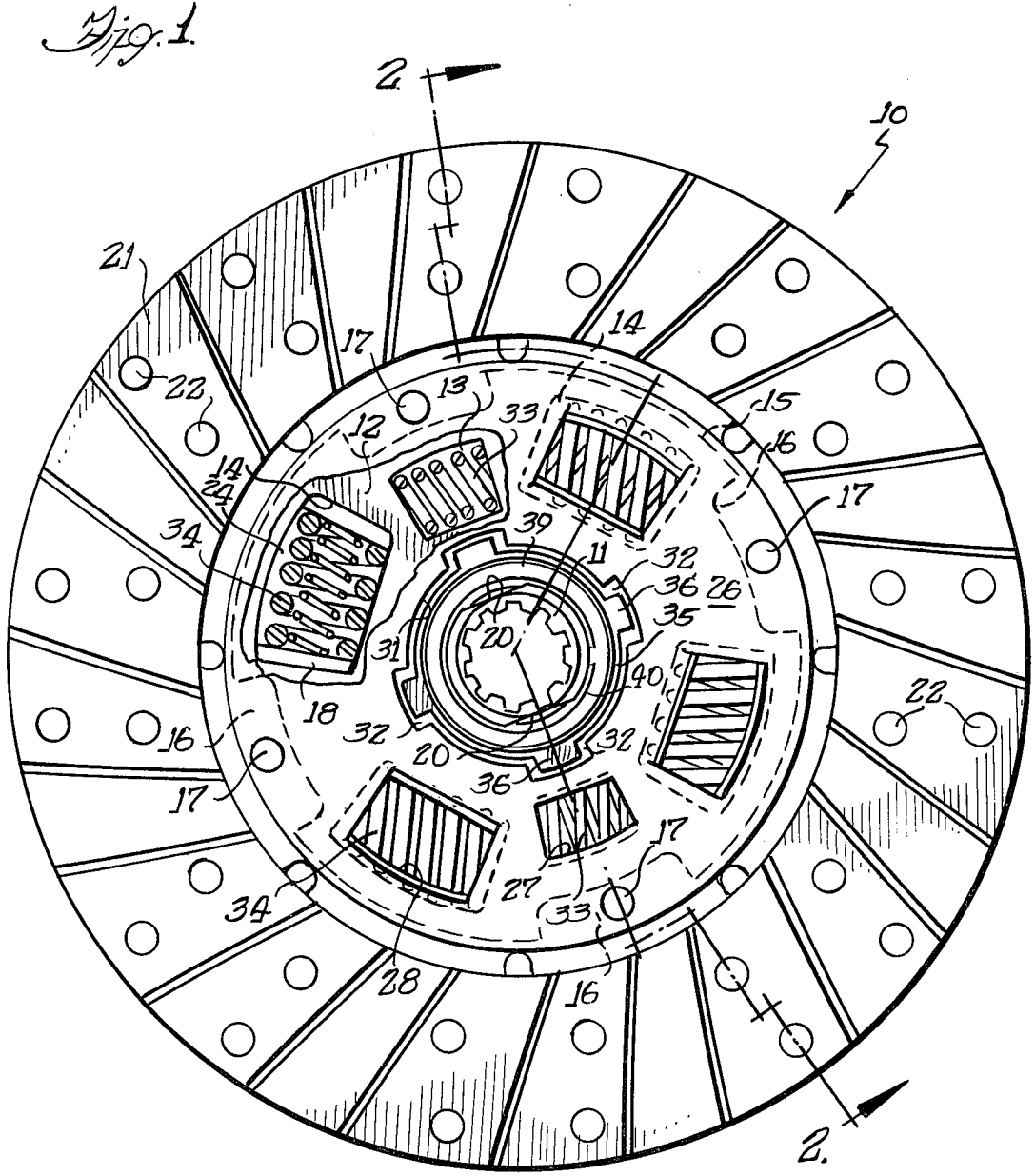
FIG. 1 is a rear elevational view of a friction clutch plate assembly, with portions broken away, embodying the vibration damper of the present invention.

Referring more particularly to the disclosure in the drawings wherein are shown illustrative embodiments of the present invention, FIGS. 1 through 4 disclose a clutch driven plate assembly 10 having a two-stage vibration damper within the assembly to provide multi-stage vibration damping. The clutch plate assembly includes a hub with a generally tubular barrel 11 and having flattened portions 20 and an integral radial flange 12 intermediate the ends of the barrel and formed with a pair of diametrically opposed smaller spring windows 13 and four circumferentially spaced larger spring windows 14. The periphery 15 of the flange is provided with elongated arcuate notches 16 to receive stop pins 17.

A clutch driven plate 18 is journalled at its inner periphery 19 on the hub barrel 11 and carries annular friction facings 21 adjacent its outer periphery; the facings being secured to the plate by rivets 22. The plate has a pair of smaller spring windows 23, four larger spring windows 24 and a plurality of openings 25 to receive an end of each stop pin 17. A spring retainer plate 26 located on the opposite side of the hub flange 12 has a pair of smaller spring windows 27, four larger spring windows 28 and a plurality of openings 29 to receive the opposite ends of the stop pins 17. The inner periphery 31 of the plate 26 is spaced outwardly from the hub barrel 11 and is provided with a plurality of circumferentially spaced notches 32 for a purpose to be later described.

Each set of smaller spring windows 13, 23 and 27 are all of the same arcuate length and are axially aligned to receive a low rate compression spring 33 therein for the first stage of travel. Likewise each set of larger spring windows 14, 24 and 28 are axially aligned to receive damper springs or spring sets 34; the windows 14 in the hub flange 12 being a greater arcuate length than the windows 24 and 28 to provide limited lost motion in operation of the damper.

Journalled on the hub barrel 11 is a generally annular friction plate 35 having circumferentially spaced tangs 36 on the outer periphery received in the notches 32 of the spring retainer plate 26; both the plate 26 and friction plate 35 lying in a common plane and in sliding engagement with the side of the hub flange 12. An annular thrust plate 37 having inner flattened surfaces 38 cooperating with the hub flats on the barrel 11 remains stationary with the hub barrel in frictional sliding engagement with the rotating friction plate 35, and a Belleville spring 39 is located on the barrel against the thrust plate 37 and retained by a snap ring 40 received in a groove 41 in the barrel. The Belleville spring 39 urges the thrust plate 37 against the friction plate 35 to create frictional sliding engagement with the hub flange 12. Each notch 32 has a greater arcuate length than the tang 36 received therein to provide a clearance "x" (FIG. 3) in one or both of the drive and coast directions.

When torque is applied through engagement of the friction facings 21 with the rotating surfaces of the flywheel and pressure plate (not shown) of the clutch, plates 18 and 26 move in unison compressing the pair of diametrically opposed low rate damper springs 33 while the higher rate springs 34 are not compressed due to the enlarged windows 14 in the hub flange. During this first stage of travel, zero or low damping friction occurs as the plate 26 rotates relative to the stationary friction plate 35 through the distance "x" (FIG. 3). When the slots or notches 32 of plate 26 contact the tangs 36 of the friction plate, the plates 26 and 35 rotate in unison to provide a greater damping friction, the thrust plate 37 remaining stationary, as required for the remainder of damper travel. The tangs are desirably picked up when the higher rate springs 34 contact the hub flange to be compressed for the second stage of travel. The assembly then provides the requisite damping action between the friction facings and the hub barrel transmitting torque to the transmission input shaft received in the splined passage 42 in the hub barrel.

FIGS. 5 through 10 disclose an alternate embodiment of damper assembly 45 wherein the parts identical to those of FIGS. 1 through 4 will have the same reference numeral with a script a. This assembly includes a clutch hub having a barrel 11a having flats 20a and flange 12a, a clutch driven plate 18a journalled on the hub barrel and carrying the friction facings 21a, and a spring retainer plate 26a secured to the clutch plate 18a by stop pins 17a extending through peripheral notches 16a in the hub flange 12a. Small spring windows 13a, 23a and 27a in the hub flange 12a, clutch plate 18a and spring retainer plate 26a, respectively, have equal lengths and are axially aligned to receive low rate damper springs 33a. Likewise, the larger spring windows 14a, 24a and 28a are axially aligned to receive higher rate damper springs 34a; the windows 14a having a greater length than the windows 24a and 28a to provide lost motion between the springs 34a and flange 12a during the first stage of travel.

The inner periphery 31a of the spring retainer plate 26a is provided with notches 32a to receive the tangs 36a of the friction plate 35a; the notches providing a distance "x" (FIG. 8) on each side of the tangs 36a. A first thrust plate 37a having flats 38a is biased by the Belleville spring 39a frictionally against the friction plate 35a, while a second thrust plate 46 having flats 47 parallels to the first thrust plate 37a and is directly engaged by the Belleville spring 39a. Located between the thrust plates 37a and 46 is a second friction plate 48 journalled on the hub barrel 11a. The outer periphery 49 of plate 48 is provided with outwardly and then forwardly extending ears or tangs 50 which are received in elongated arcuate slots 51 in the spring retainer plate 26a; the slots 51 being positioned between and radially outwardly of the notches 32a in the inner periphery 31a. The slots 51 provide a circumferential clearance "y" (FIG. 8) relative to the tangs 50.

This alternate embodiment 45 provides damping friction variations of zero or low friction, single friction or double friction as desired by modifying the clearance "x" and "y" as seen in FIG. 8, between the tangs and slots or notches in the damping friction area. One arrangement utilizes an equal clearance in both the notches 32a and the slots 51 to provide double friction in the second stage of travel. Thus, where "x" equals "y", initial application of torque to the clutch plate 18a causes rotation of the plates 18a and 26a relative to the hub flange 12a compressing the low rate springs 33a until the springs 34a contact the edges of spring windows 14a of the hub flange; the plate 26a also moving relative to the friction plates 35a and 48. At the point where the springs 34a engage the flange windows 14a, the notches 32a and slots 51 pick up the tangs 36a and 50, respectively to provide double friction resulting from the Belleville spring 39a and thrust plates 37a and 46 acting on the friction plates 35a and 48.

By adjusting the clearances so that "y" is greater than "x", a third stage friction damping action is obtained. Thus, rotation of the spring retainer plate 26a relative to the friction plates 35a and 48 provides a first stage of zero or low friction through the clearance "x". When the notches 32a pick up the tangs 36a, a single friction damping occurs through rotation of friction plate 35a in frictional contact with the hub flange 12a and the thrust plate 37a. When the plates 26a and 35a rotate through the distance of "y" minus "x", the slots 51 then pick up the tangs 50 of the second friction plate 48 to provide a double friction damping action for the remainder of travel. FIG. 10 discloses the travel of the damper assembly as all of the springs 33a and 34a are compressed until the stop pins 17a move to and contact the ends of the elongated notches 16a. The relative angular position of the retainer plate 26a to the friction plates 35a and 48 remains the same as in FIG. 9 and only the angular relationship to the hub 11a has changed due to the continued travel.

Obviously, whether the transition from zero damping to single friction damping or double friction damping occurs simultaneously with the engagement of the high rate damper springs is a matter of choice. The transition could occur earlier, simultaneously or later than the initiation of compression of the high rate damping springs depending on the damping characteristics desired for the clutch assembly. Also, in both embodiments, the clearance "x" or the clearances "x" and "y" are shown for both the drive and coast directions of rotation of the clutch assembly, however, depending on the desired characteristics, the clearance for the coast side in the notches 32 or 32a and the slots 51 may be omitted. In that case, a multi-stage friction damping would only occur in the drive direction of rotation.

I claim:

1. A clutch driven plate assembly having torsional vibration damping means therein, including a hub having a barrel and radial flange, a clutch driven plate journalled on said barrel and carrying friction facings, a spring retainer plate on the opposite side of the hub flange from and secured to said clutch driven plate, axially aligned spring windows in said plates and hub flange including a pair of diametrically oppositely disposed axially aligned spring windows of the same length in the clutch driven and spring retainer plates and hub flange and a plurality of circumferentially spaced sets of axially aligned spring windows having lost motion means comprising axially aligned windows of the same length in the clutch driven and spring retainer plates and windows of a greater length than the plate windows in the hub flange and damper springs received in each set of aligned windows including a pair of low rate compression springs received in the pair of diametrically oppositely disposed spring windows and a plurality of high rate compression springs received in the plurality of circumferentially spaced spring windows, the improvement comprising a friction plate journalled on the hub barrel concentric with and in the same plane as the spring retainer plate, lost motion means connecting said friction plate and spring retainer plate comprising a plurality of circumferentially spaced tangs on the periphery of the friction plate and a plurality of notches on the inner periphery of said spring retainer plate receiving said tangs, the length of each notch being greater than the width of its corresponding tang, and a resiliently biased thrust plate on said barrel in frictional engagement with said friction plate.

2. A clutch driven plate assembly as set forth in claim 1, wherein a Belleville spring contacts said thrust plate to bias the friction plate against said hub flange.

3. A clutch driven plate assembly as set forth in claim 1, in which said hub barrel and said thrust plate having complementary flattened portions so that the thrust plate remains stationary with said hub.

4. A clutch driven plate assembly as set forth in claim 3, wherein said lost motion means provides a first stage of travel with substantially zero damping friction and a second stage of travel with increased damping friction.

5. A clutch driven plate assembly having torsional vibration damping means therein, including a hub having a barrel and radial flange, a clutch driven plate journalled on said barrel and carrying friction facings, a spring retainer plate on the opposite side of the hub flange from and secured to said clutch driven plate, axially aligned spring windows in said plates and hub flange, and damper springs received in each set of aligned windows, the improvement comprising a friction plate journalled on the hub barrel concentric with and in the same plane as the spring retainer plate, lost motion means connecting said friction plate and spring retainer plate including a plurality of circumferentially spaced tangs on the periphery of the friction plate and a plurality of notches on the inner periphery of said spring retainer plate receiving said tangs, the length of each notch being greater than the width of its corresponding tang, a resiliently biased thrust plate on said barrel in frictional engagement with said friction plate, a second friction plate journalled on said hub barrel, a second thrust plate on said barrel, said second friction plate being located between the two thrust plates, and second lost motion means connecting said second thrust plate with said spring retainer plate.

6. A clutch driven plate assembly as set forth in claim 5, in which said hub barrel and both thrust plates have complementary flattened portions so that the thrust plates remain stationary with said hub.

7. A clutch driven plate assembly as set forth in claim 5, in which said support lost motion means includes a plurality of circumferentially spaced tangs on the periphery of the second friction plate, and said spring retainer plate having spaced elongated slots receiving said last mentioned tangs, said second lost motion means acting independently of the first lost motion means.

8. A clutch driven plate assembly as set forth in claim 7, in which said second friction plate may be engaged by said spring retainer plate simultaneously with or subsequently to engagement of the first friction plate to provide a two-stage or three-stage friction damping action.

9. A clutch driven plate assembly as set forth in claim 1, wherein said friction plate is radially within said spring retainer plate, and said notches receiving said tangs having clearance in at least the drive direction.

10. A clutch driven plate assembly having torsional vibration damping means therein, including a hub having a barrel and radial flange, a clutch driven plate journalled on said barrel and carrying friction facings, a spring retainer plate on the opposite side of the hub flange from and secured to said clutch driven plate, a pair of diametrically oppositely disposed axially aligned spring windows of equal length in said plates and hub flange and a plurality of circumferentially spaced axially aligned spring windows, said last mentioned spring windows having lost motion means so as to provide first and second stages of damper travel including windows in the plates of the same length and windows in the hub flange of a greater length than the plate windows, a pair of low rate compression springs received in the first mentioned spring windows and a plurality of high rate compression springs received in the last mentioned spring windows, the improvement comprising a friction plate journalled on the hub barrel concentric with and in the same plane as the spring retainer plate, lost motion means connecting said friction plate and spring retainer plate comprising a plurality of circumferentially spaced tangs on the outer periphery of said friction plate which is radially within said spring retainer plate, said spring retainer plate having notches in its inner periphery receiving said tangs with clearance in at least the drive direction, a resiliently biased thrust plate on said barrel in frictional engagement with said friction plate, a second thrust plate biased toward said hub flange, a second friction plate between said thrust plates, and lost motion means between said second friction plate and said spring retainer plate including a plurality of circumferentially spaced tangs on the second friction plate, and said spring retainer plate having elongated slots receiving said last mentioned tangs with clearance in at least the drive direction, said slots being located radially outwardly of and intermediate said notches.

11. A clutch driven plate assembly as set forth in claim 10, in which the clearance for the tangs in the slots is greater than the clearance for the tangs in the notches.

12. A clutch driven plate assembly as set forth in claim 10, wherein said hub barrel has a pair of oppositely disposed flattened portions, and each thrust plate has a central opening with a pair of complementary oppositely disposed flattened portions interengaging with the barrel portions to prevent relative rotation between said hub and thrust plates.

* * * * *

UNITED STATES PATENT AND TRADEMARK OFFICE
CERTIFICATE OF CORRECTION

PATENT NO. : 4,485,908

DATED : December 4, 1984

INVENTOR(S) : SIDNEY ULANE GATEWOOD

It is certified that error appears in the above—identified patent and that said Letters Patent is hereby corrected as shown below:

Column 5, line 45, cancel "having" and insert -- have --.

Column 6, line 13, cancel "support" and insert -- second --.

Signed and Sealed this

Twenty-third Day of April 1985

[SEAL]

Attest:

DONALD J. QUIGG

Attesting Officer     Acting Commissioner of Patents and Trademarks